United States Patent [19]

Freund

[11] Patent Number: 5,384,100

[45] Date of Patent: Jan. 24, 1995

[54] BAFFLE ASSEMBLY FOR CATALYTIC CONVERTER

[75] Inventor: Jean-Pierre Freund, Strassburg, France

[73] Assignee: Sotralentz S.A., Drulingen, Germany

[21] Appl. No.: 118,386

[22] Filed: Sep. 8, 1993

[30] Foreign Application Priority Data

Sep. 8, 1992 [FR] France .................. 92 10831

[51] Int. Cl.[6] ............................................. B01J 35/04
[52] U.S. Cl. .................................. 422/180; 422/177; 422/222; 422/228; 502/439; 502/527
[58] Field of Search ............... 422/177, 180, 211, 222, 422/228; 502/527, 439; 60/300, 299

[56] References Cited

U.S. PATENT DOCUMENTS

| | | |
|---|---|---|
| 3,083,662 | 4/1963 | Zeidler ............................. 29/163.6 |
| 4,152,302 | 5/1979 | Nonnenmann et al. ........ 423/213.5 |
| 4,273,681 | 6/1981 | Nonnenmann ................... 502/527 |
| 4,665,051 | 5/1987 | Nonnenmann ................... 502/439 |
| 4,672,809 | 6/1987 | Cornelison et al. ............. 502/527 |
| 5,170,624 | 12/1992 | Cornelison et al. ............. 60/300 |

Primary Examiner—Robert J. Warden
Assistant Examiner—Hien Tran
Attorney, Agent, or Firm—Herbert Dubno; Andrew Wilford

[57] ABSTRACT

A baffle assembly for a catalytic converter through which a fluid flows axially has a stack of baffle plates each formed with a row of axially open-ended bumps having tops and, adjacent to the bump row, with a row of axially open-ended grooves having bottoms and substantially narrower than the bumps. Each bump is axially aligned with a respective groove of the respective plate. A plurality of flat spacer strips are sandwiched between the tops and bottoms of the bumps and grooves of adjacent baffle plates. The bumps and grooves form substantially parallel axially throughgoing passages for the fluid.

7 Claims, 5 Drawing Sheets

BAFFLE ASSEMBLY FOR CATALYTIC CONVERTER

FIELD OF THE INVENTION

The present invention relates to a baffle assembly for passively mixing a fluid. More particularly this invention concerns a baffle assembly used in a catalytic converter for contacting a gas with catalytic surfaces.

BACKGROUND OF THE INVENTION

A standard baffle assembly of the type used in a catalytic converter for processing the exhaust gases of a motor-vehicle engine has a housing holding a baffle assembly forming a multiplicity of passages through which the exhaust gases flow. The baffle assembly is formed as a stack of baffles that each form a plurality of parallel passages and the baffles themselves are catalyst supports, that is they are typically formed of or coated with the catalyst in question.

As a rule the process entails the catalytic conversion of carbon monoxide (CO), nitrogen oxides ($NO_x$), and hydrocarbon residues ($C_mH_n$) into harmless gases, mainly carbon dioxide ($CO_2$), oxygen ($O_2$), and nitrogen ($N_2$). Typically the catalyst is platinum based and is applied as a surface layer to the metal normally forming the baffles. For such a converter to work well the gases must be intimately contacted with the catalytic surfaces while above a certain temperature. There is however an upper temperature threshold that must be avoided to prevent damage to the catalyst. Thus it is critical to get good flow through the converter in such a manner that all the molecules in the passing gases at some time come into contact with the catalyst, thereby also ensuring good uniform heat transfer and that the baffles are maintained in the desired temperature range.

A standard baffle is formed as a corrugated metal sheet sandwiched between a pair of flat sheets. It is also known to form the entire baffle assembly as an extruded ceramic body formed with a multiplicity of longitudinally throughgoing passages. Thus the baffle assembly forms a honeycomb having a plurality of full-length passages. In order to maximize heat transfer and catalyst/gas contact, each passage is relatively small in cross section, typically about 1 mm², and is about 100 mm long. The flow in such passages is wholly laminar, but due to the small cross section relatively good contact with the passage walls is ensured.

Such arrangements present a relatively large resistance to flow due to the small passage size. Furthermore they tend to heat up excessively at the center so that the catalyst can be burnt off while not heating up enough at the outer periphery and intake end to ensure catalytic action there. A burning particle can easily lodge in such a baffle assembly and block and/or damage it.

OBJECTS OF THE INVENTION

It is therefore an object of the present invention to provide an improved baffle assembly.

Another object is the provision of such an improved baffle assembly which overcomes the above-given disadvantages, that is which presents low back pressure while ensuring excellent heat transfer and fluid/catalyst contact.

SUMMARY OF THE INVENTION

A baffle assembly for a catalytic converter through which a fluid flows axially has according to the invention a stack of like baffle plates each formed with a row of axially open-ended bumps or ridges having tops and, adjacent to the bump row, with a row of axially open-ended grooves having bottoms and substantially narrower than the bumps. The bumps and grooves are formed as channels that open oppositely and the baffle plates are of constant thickness. Each bump is axially aligned with a respective groove of the respective plate. A plurality of flat spacer strips are sandwiched between the tops of the bumps and bottoms of the grooves of adjacent baffle plates. The bumps and grooves form substantially parallel axially throughgoing passages for the fluid.

Thus with this system, since each groove is narrower than the respective ridge, the stream of fluid flowing axially through the baffle assembly is inherently broken up and then reunited. This creates turbulence which ensures excellent contacting of the fluid with the catalyst-coated walls of the plates and strips and also excellent heat exchange therewith.

The inner turbulence is created by a series of laterally interconnected short passages that work much better than the prior-art systems with axially continuously throughgoing passages. Thus once the fluid enters the upstream end of the baffle assembly, it is quickly distributed over its entire cross section. This increases the catalytic activity over the prior-art systems since the gases are distributed over the entire cross section of the converter. Furthermore this system makes it possible to use passages of much greater flow cross section than the prior-art arrangements, thereby greatly reducing back pressure. These larger passages also reduce the likelihood of any passages getting plugged. Furthermore since the passages are wider, less metal can be used in the system so that the system will heat up more quickly and can be produced more cheaply. If a hot particle comes to rest in the system of this invention, the excellent heat conduction and turbulent flow will prevent it from burning a hole in the baffle plate it lands on, and the large passage size will make it impossible for a particle to block it completely.

The plates and strips can be generally planar or each of the plates and strips can be generally cylindrically tubular and the plates and strips can be nested coaxially in each other. It is also possible for the plates and strips spirally wound up about each other.

A catalytic converter according to the invention has a generally tubular housing defining an axially throughgoing space in which is held the stack of annular sections of at least one baffle plate and a plurality of annular sections of at least one flat spacer strip sandwiched between the tops and bottoms of the bumps and grooves of adjacent baffle-plate sections. The converter can have only one such baffle plate and strip and they can be wound together as interleaved spirals in the housing or it can have a plurality of such baffle plates and strips each formed generally tubularly cylindrical and all nested coaxially together.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
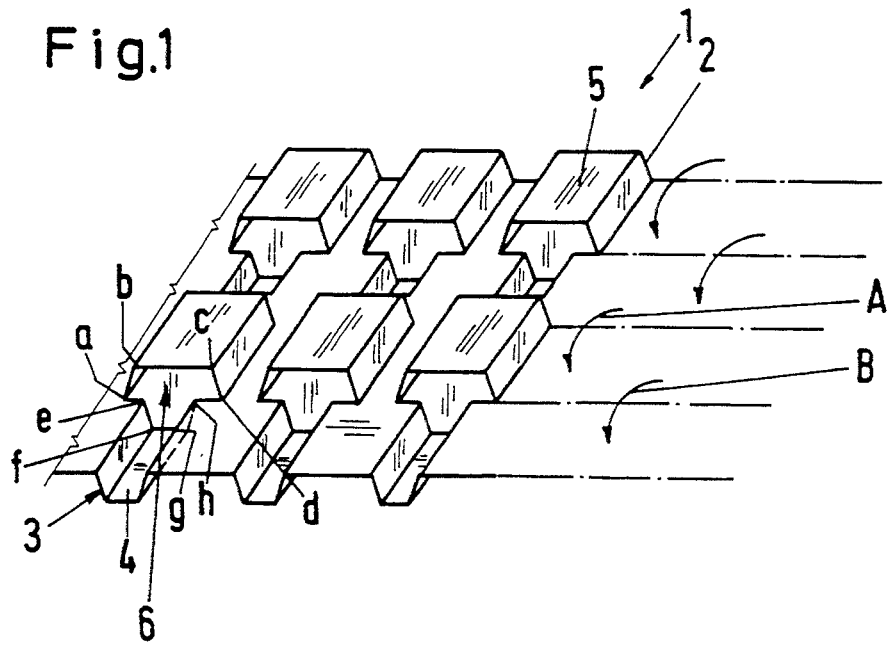
FIG. 1 is a partial perspective view of a baffle element according to this invention.

As seen in FIG. 1 a baffle element strip 1 according to this invention is unitarily formed of bent sheet metal as parallel alternating strips A and B. The strip is formed with isosceles trapezoidal bumps or ridges 2 having planar tops 5 and the strip B is formed with identically spaced isosceles trapezoidal grooves or channels 3 that have floors 4. The channels 3 are substantially narrower than the respective bumps 2 they are aligned with. The side angles and heights above the plane of the strip 1 of the grooves 3 and bumps 2 are identical so that the rectified length of each bump 2 measured along points a, b, c, and d is identical to the rectified length of each groove 3 measured along points a, e, f, g, h, and d. This makes it possible to produce the strip 1 by stamping without tearing or stretching the metal, typically platinum-coated, it is made of. The channel grooves 3 and ridges 2 are aligned with one another within the same strip 1.

Figure 2:
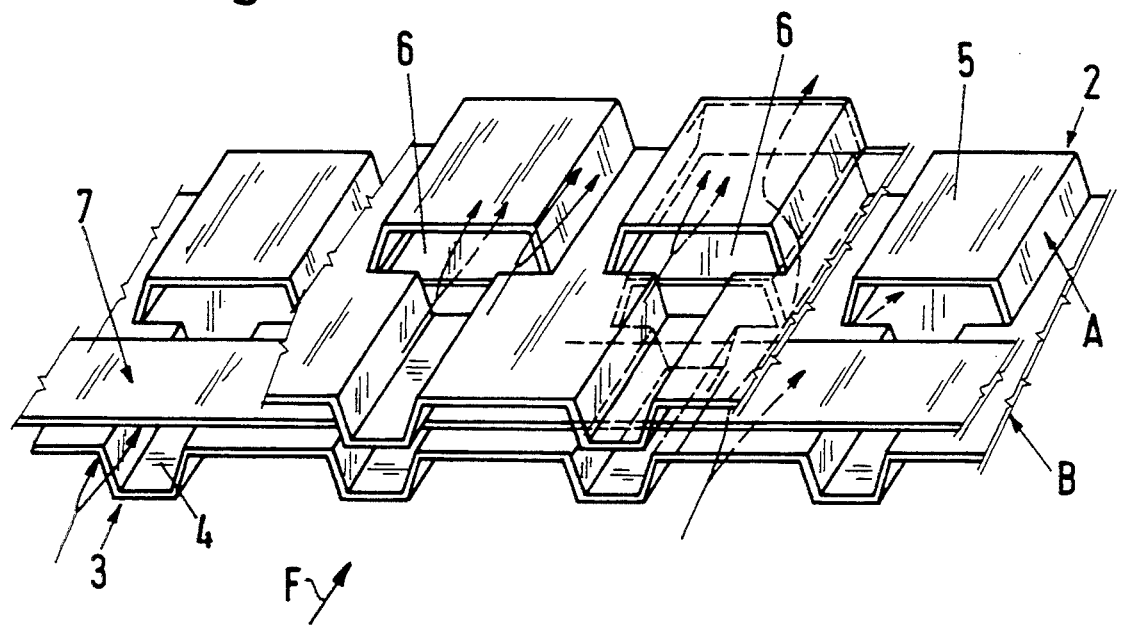
FIG. 2 is a larger-scale perspective view of a part of a baffle assembly in accordance with the invention.

As seen in FIG. 2, and 5–7 a baffle assembly includes a plurality of such strips 1 stacked atop each other with relatively thin and flat spacer strips 7 provided between them to prevent the formations constituted by the bumps and grooves 2 and 3 from nesting in each other. In FIG. 2 the strip 7 is shown to have a width substantially shorter than the width of the strip region B it is sitting on. Here the bumps 2 and grooves 3 form passages 6 so that a fluid, here exhaust gases flowing through them in direction F, is subdivided into streams that are split up and reunited as illustrated by the arrows. Since each channel groove 3 is axially aligned with the channel ridge 2 of the downstream and upstream strips 1, axial slippage of the strips 1 is impossible.

Figure 3A:
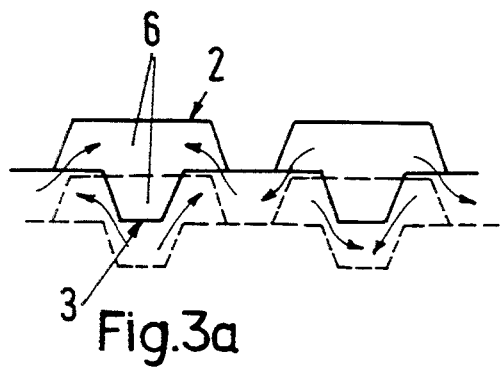
FIGS. 3a and 3b are schematic end views illustrating the baffle systems of this invention.
Figure 3B:
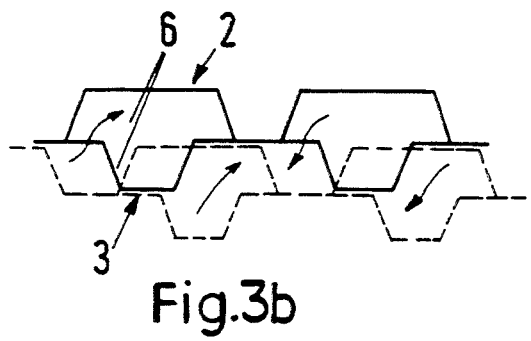

In this arrangement the bumps 2 of the top strip 1 are directly above the bumps 2 of the underlying strip as also shown in FIG. 3a. It is possible for them to be staggered relative to each other as shown in FIG. 3b, where, as in FIG. 3a, the spacer strips 7 are not shown for clarity of view.

Figure 4:
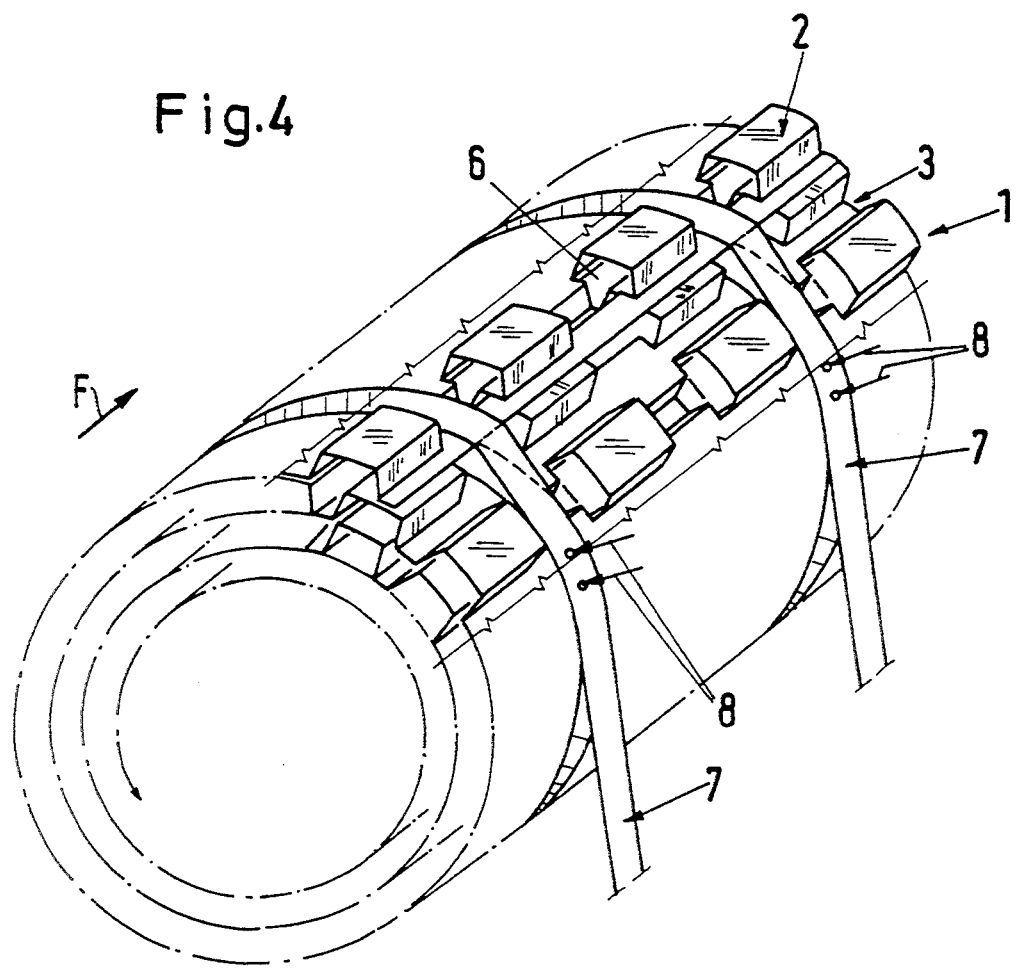
FIG. 4 is a small-scale perspective view of a complete baffle assembly according to the invention.
Figure 5:
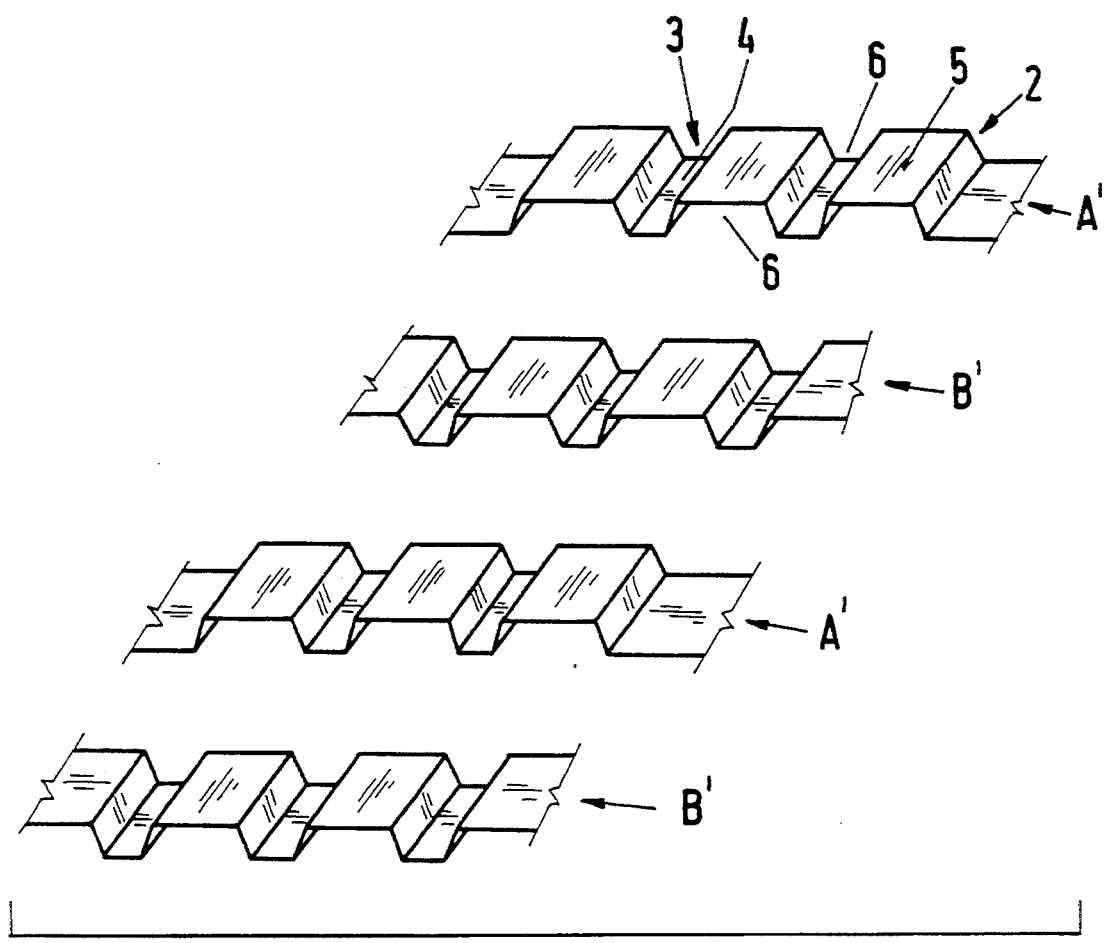
FIGS. 5, 6, and 7 illustrate the shape of the baffle strips in accordance with this invention.
Figure 6:
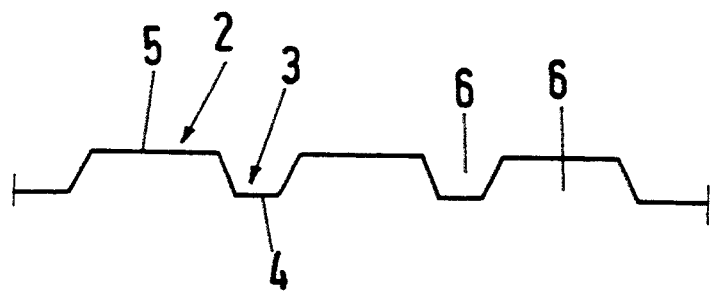
Figure 7:
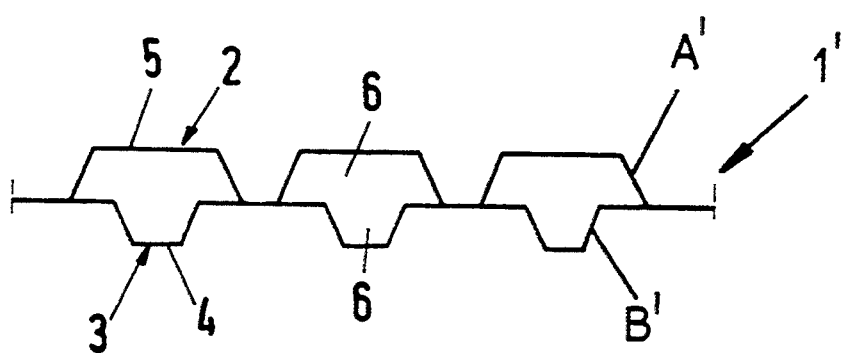

FIG. 4 shows how the strips 1 and 7 can be wound up as a spiral to produce a baffle assembly ideal for use as a motor-vehicle catalytic converter that gas will flow axially through as shown by the arrow F. The strips 7 are longer than the strip 1 so that they can be soldered, riveted, glued, welded, or otherwise attached to the outermost layer of the strip 1 at points 8, securing the assembly together. In this embodiment there will inherently be some offset of each turn of the strip 1 to the underlying strip, producing the offset but overlapping passages 6 as shown in FIG. 3b.

Figure 8:
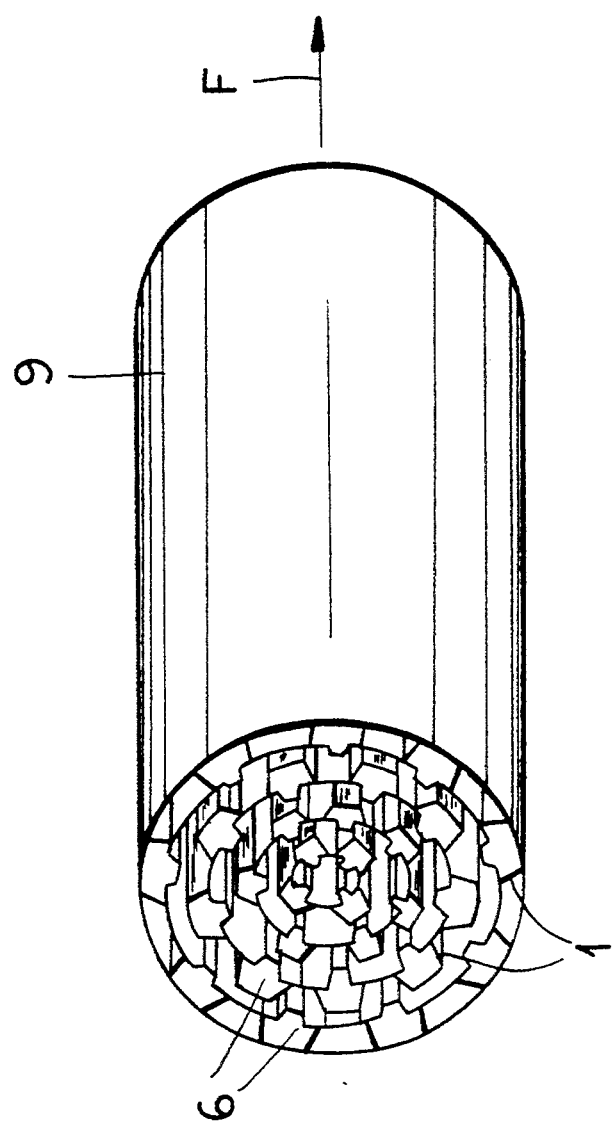
FIG. 8 is a small-scale perspective view of a catalytic converter incorporating another baffle system of this invention.

Another catalytic converter is shown in FIG. 8. Here the strips 1 and 7 are shaped into cylindrical tubes of graduated sizes that are fitted coaxially in one another and then into a housing sleeve 9. In this embodiment also the passages 6 will be offset from each other.

With the system of this invention the flow through the baffle assembly will be split up and then variously reunited at each strip 1. This produces some turbulence that ensures that every molecule of the throughflowing fluid will contact the catalytic material on the surfaces of the strips 1 and 7.

I claim:

1. A baffle assembly for a catalytic converter through which a fluid flows axially, the assembly comprising:

a stack of generally identical baffle plates each lying in a respective plane, and each formed to one side of the respective plane with a row of axially open-ended bumps having tops and, adjacent to the bump row and and to the other side of the respective plane, with a row of axially open-ended grooves having bottoms and being substantially narrower than the bumps, each bump of a respective plate being axially aligned with a respective groove of the respective plate; and a plurality of flat spacer strips sandwiched between the tops of the bumps and the bottoms of the grooves of adjacent baffle plates with each row of bumps overlying the row of bumps of the adjacent baffle plate and each row of grooves overlying the row of grooves of the adjacent baffle plate, the bumps and grooves forming substantially parallel axially throughgoing passages for a fluid.

2. The baffle assembly defined in claim 1 wherein the plates and strips are spirally wound up about each other.

3. A catalytic converter comprising:

a generally tubular housing defining an axially throughgoing interior space;

a stack of baffle plates in the housing each lying in a respective cylindrical surface, and each formed to one side of the respective cylindrical surface with a row of axially open-ended bumps having tops and, adjacent to the bump row and to the other side of the respective cylindrical surface, with a row of axially open-ended grooves having bottoms and being substantially narrower than the bumps, each bump of a respective plate being axially aligned with a respective groove of the respective plate; and a plurality of flat and generally cylindrical spacer strips sandwiched between the tops of the bumps and the bottoms of the grooves of adjacent baffle plates with each row of bumps overlying the row of bumps of the adjacent baffle plate and each row of grooves overlying the row of grooves of the adjacent baffle plate, the bumps and grooves forming substantially parallel axially throughgoing passages for a fluid.

4. A catalytic converter comprising:

a generally tubular housing defining an axially throughgoing interior space;

a plurality of annular sections of at least one baffle plate in the housing lying in a respective warped planar surface, and each formed to one side of the respective warped planar surface with a row of axially open-ended bumps having tops and, adjacent to the bump row and to the other side of the respective warped planar surface, with a row of axially open-ended grooves having bottoms and substantially narrower than the bumps, each bump of a respective plate being axially aligned with a respective groove of the respective plate; and a plurality of annular sections of at least one flat spacer strip sandwiched between the tops of the bumps and the bottoms of the grooves of adjacent baffle-plate sections with each row of bumps overlying the row of bumps of the adjacent baffle plate and each row of grooves overlying the row of grooves of the adjacent baffle plate, the bumps and grooves forming substantially parallel axially throughgoing passages for a fluid.

5. The converter defined in claim 6 wherein said at least one baffle plate comprises only one of said baffle plate and said at least one flat spacer strip comprises only one of said strip and the plate and strip are spirally wound together in the housing.

6. The converter defined in claim 4 wherein said at least one baffle plate comprises a plurality of said baffle plates and said at least one flat spacer strip comprises a plurality of said strips, each formed generally tubularly cylindrical and all nested coaxially together.

7. The converter defined in claim 6 wherein each of the bumps and each of the grooves are substantially trapezoidal.

* * * * *